March 3, 1953  G. A. LYON  2,629,957
ORNAMENTAL INSERT FOR WHEEL STRUCTURE
Filed Oct. 12, 1948  2 SHEETS—SHEET 2
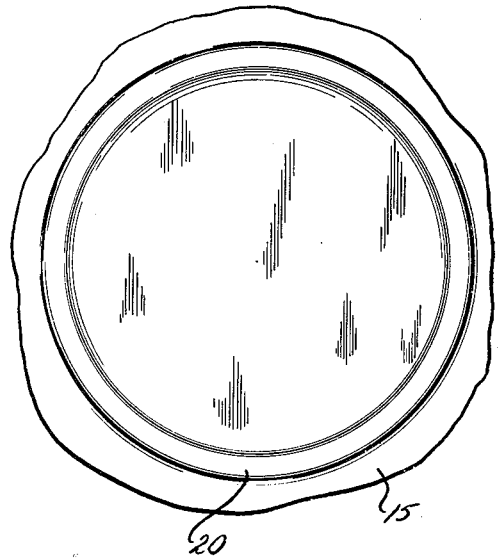
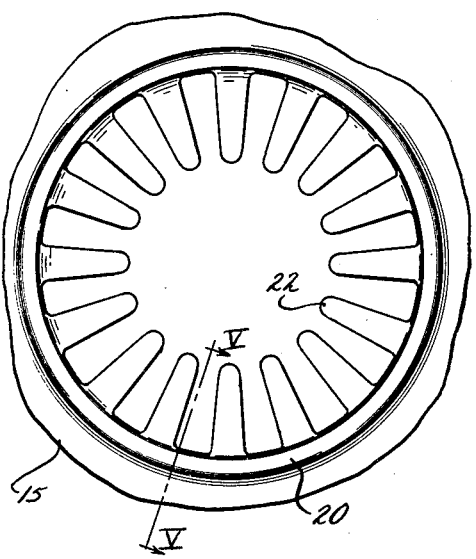
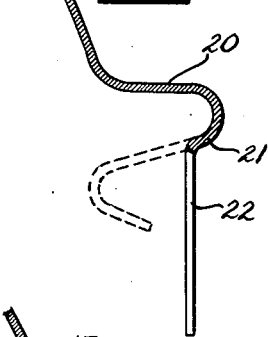
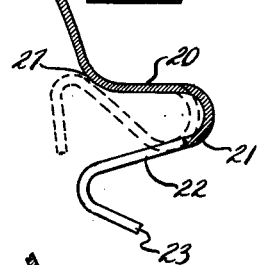
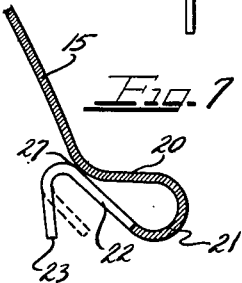
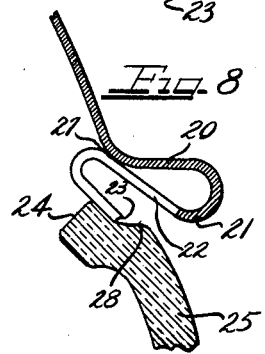
Inventor
GEORGE ALBERT LYON
by *[signature]* Attys.

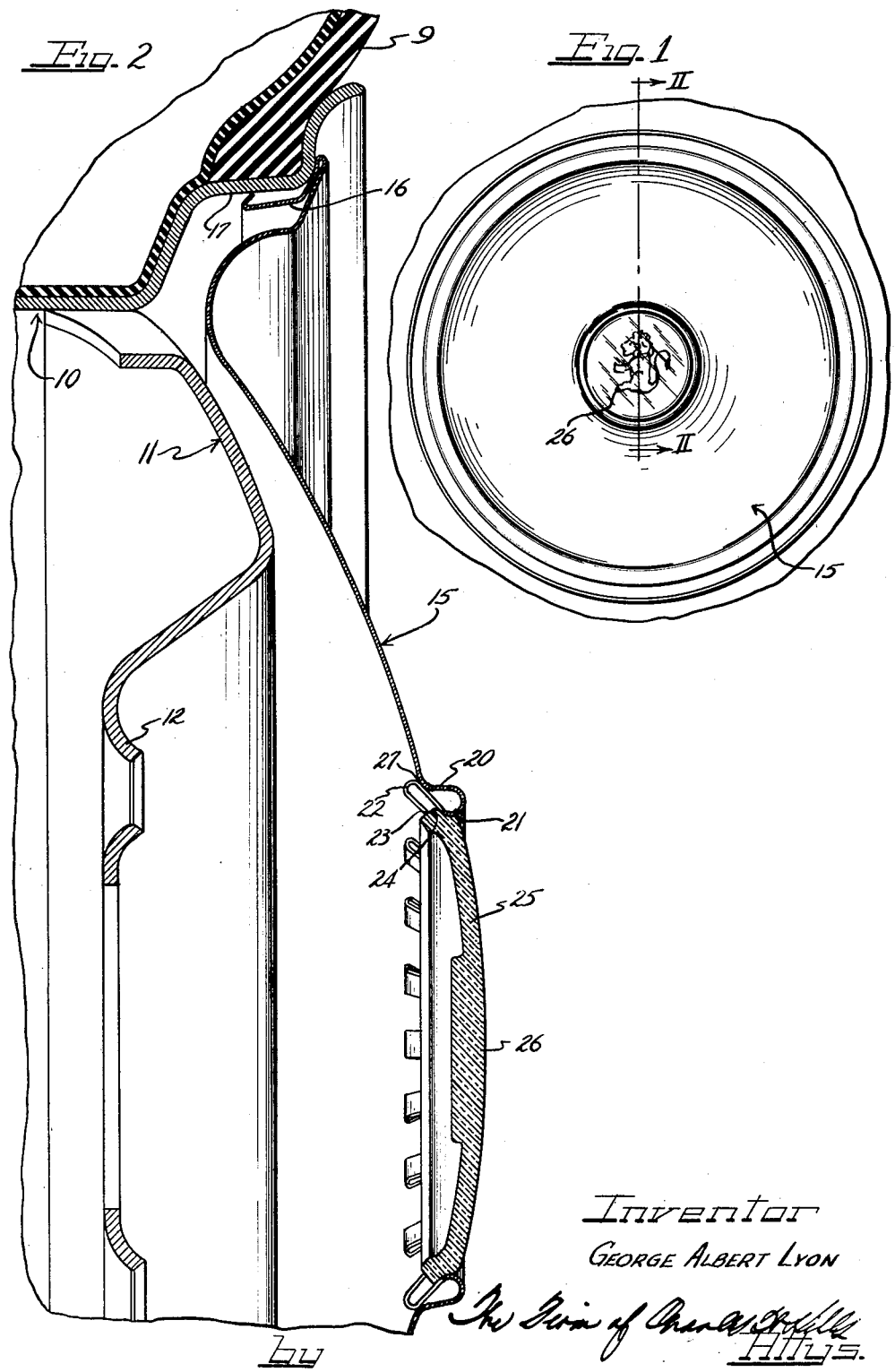

Patented Mar. 3, 1953

2,629,957

UNITED STATES PATENT OFFICE 2,629,957

ORNAMENTAL INSERT FOR WHEEL STRUCTURE

George Albert Lyon, Detroit, Mich.

Application October 12, 1948, Serial No. 54,162

6 Claims. (Cl. 41—34)

This invention relates to an ornamental structure and more particularly to one adapted to be used on a vehicle and more particularly on automobile wheels.

An object of this invention is to provide a simple economical structure for holding an insert in an opening such as in the center of a wheel cover and the like.

Another object of this invention is to provide a snap-on reflector insert which is easily detachable for replacement in the event of damage or breaking.

Yet another object of this invention is to provide yieldable retaining means for a medallion, such as is used on automobiles and elsewhere.

A still further object of this invention relates to the provision of retaining means for an insert of the foregoing type which lends itself to economical manufacture on a large production basis such, for example, in the form of stampings.

Yet another object of this invention relates to the provision of a novel way of forming inverted U-shaped retaining fingers for use in the retention of an insert snapped into engagement with the fingers.

In accordance with the general features of this invention there is provided in a composite article of manufacture a supporting member having a central hole defined by an edge and a plurality of spaced fingers laterally offset from said edge, and an insert snapped under said fingers in said hole and having a shouldered portion to one side of said hole gripped by the fingers; these fingers exerting a resilient force on the insert to urge it axially into said hole and tightly against said edge.

Another feature of the invention relates to the inclination of the fingers generally radially from the hole so that the force exerted by the same on the insert occasions a resultant force in an axial direction for wedging the insert tightly against the edge in the supporting member.

Other objects and features of this invention will more fully appear from the following detailed description taken in connection with the accompanying drawings which illustrate a single embodiment thereof and in which:

Figure 1 is a fragmentary side view of a wheel structure having a medallion insert secured secured thereto in accordance with the features of this invention;

Figure 2 is a fragmentary cross-sectional view taken generally on the line II—II of Figure 1 looking in the direction indicated by the arrows;

Figure 3 is a fragmentary side or front view of the central portion of the wheel cover of Figure 2 in an initial stage of its fabrication;

Figure 4 is a view similar to Figure 3 showing how the retaining fingers are stamped from the central portion of the cover;

Figure 5 is a fragmentary cross-sectional view on the line V—V of Figure 4 and showing by dotted lines an initial step in the bending of the fingers;

Figure 6 is a fragmentary sectional view similar to Figure 5 showing a still further bending operation in the formation of the finger;

Figure 7 is a fragmentary sectional view similar to Figure 6 showing by dotted lines how the extremity of the finger is bent into its final shape; and Figure 8 is a fragmentary sectional view similar to Figure 7 and showing a central insert or medallion in the process of being pressed home into retaining engagement with the retaining fingers.

As shown on the drawings:

While in the accompanying drawings I have illustrated my insert as being applied to an automobile wheel cover, it is, of course, clear that the invention is not to be limited to this specific embodiment, as obviously the insert could be used in other applications as, for example, in reflector signs, lamp assemblies, etc. In other words, the invention is useful wherever it is desired to detachably retain an insert in a central hole of a supporting member.

The reference character 9 designates generally a conventional pneumatic tire and tube assembly carried in the usual way upon a multi-flange drop center type of tire rim 10. The rim 10 is in turn carried by a dished wheel body or spider member 11 having the usual central bolt-on flange 12 by means of which the wheel can be detachably secured to a part on an axle.

A wheel cover for the outer side of the wheel is designated generally by the reference character 15 and comprises a metallic stamping provided at its outer peripheral margin with a plurality of concealed retaining fingers 16. These fingers 16 are adapted to detachably grip the surface of a flange 17 of the rim 10 to hold the cover in position over the outer side of the wheel. Obviously, any suitable retaining means could be employed for the cover without departing from the spirit of my invention and especially since my invention is more concerned with the ornamental central part of the cover which will now be described.

The central part of the cover, as best shown in Figure 2, has an axial or offset flange 20 which is curled into an edge 21 defining a central hole in the cover. The edge 21 is in reality turned back upon the portion 20 and inside of the same.

Integral with the edge 20 and extending laterally therefrom are a plurality of inverted U-shaped spring clips or fingers 22 each of which has a yieldable free extremity 23 for gripping engagement with an inclined shoulder 24 of a central circular insert 25. The insert in this embodiment of this invention is shown in the form of a glass medallion or reflector disk.

The insert or disk 25 may, of course, be made of any suitable material, although I propose in the illustrated embodiment to make it in the form of a red reflector glass with a central emblem 26. By making this insert of such material that it will reflect artificial light, it will serve as a safety medium when used in a cover on an automobile wheel.

In Figure 8 I have illustrated the manner in which the insert 25 can be snapped from the rear of the cover 15 into retained engagement with the spring clips 22. In this application of the insert to the clips the extremities of the clips first engage the annular shoulder 28 (Figure 8) on the insert and then the extremities 23 of the clips progressively yield so that they snap over and onto the beveled shoulder 24, as shown in Figure 2. In this position the clips exert a force in an inclined direction, the resultant of which is an axial force wedging the insert 25 tightly against the annular edge 21 defining the central hole in the cover 15. Moreover, any slight force tending to accidentally dislodge the insert results in the extremities 23 of the fingers more tightly engaging the shoulder 24.

Should it become necessary to remove the insert 25 by reason of damage to the same, removal of it can be easily effected by prying it forcibly free from engagement with the free extremities of the clips. In that case the end of a pry-off tool is engaged with the shoulder 25 between a pair of clips from the rear side of the cover and by exerting pressure on the tool the insert can be progressively disconnected from the clips.

It should be noted that in applying the insert 25 to the clips, as shown in Figure 8, the clips bottom at 27 against the cover 15 thereby requiring flexure of the free extremities of the clips in order for the shoulder 24 to pass over the same.

In Figures 3 to 7, inclusive, I have illustrated progressively how the central finger and shoulder structure of the cover 15 can be formed. As noted before, the cover is stamped from sheet metal and in a preliminary stamping the central portion of the cover is formed with the annular offset 20, as best shown in Figure 3. At the same time or subsequent thereto, the portion of the cover inside the annular offset 20 can be stamped out to form the fingers 22, as shown in Figures 4 and 5. Thereafter, the fingers 22 are subjected to successive bending operatings, as shown in Figures 5, 6 and 7, until they are in the final shape and condition as shown in Figure 8.

From the foregoing it is clear that I am enabled to use the metal of the cover itself to make the fingers or spring clips 22, thereby dispensing with the need for riveting or welding operations, such as would be necessary if the fingers were made from separate metal. Of course, it is desirable, in order for the fingers to be springy, that the cover 15 be made from springy sheet steel such, for example, as stainless steel.

It is also clear that by forming the offset 20 in the central portion of the cover I am in effect corrugating the cover and thereby rigidifying its central portion. This is an added advantage in that it enables thinner gauge sheet material to be used in the cover 15.

I claim as my invention:

1. In a wheel cover structure, a cover member having a central hole defined by an edge and a plurality of spring fingers behind and laterally offset from said edge and directed endwise toward said opening, a central emblem snapped past said fingers and having first marginal shoulder means in stable engagement with said edge and second marginal shoulder means facing away from said edge and gripped by the ends of said fingers, said fingers being disposed in a mutually cooperative pattern about said edge and exerting a resilient force on said second shoulder to urge the emblem axially outwardly into said hole and to drive said first shoulder substantially uniformly tightly against said edge.

2. In a wheel cover structure, a cover member having a central hole defined by an edge and a plurality of spring fingers behind and laterally offset from said edge and directed endwise toward said opening, a central emblem snapped past said fingers and having first marginal shoulder means in stable engagement with said edge and second marginal shoulder means facing away from said edge and gripped by the ends of said fingers, said fingers being disposed in a mutually cooperative pattern about said edge and exerting a resilient force on said second shoulder to urge the emblem axially outwardly into said hole and to drive said first shoulder substantially uniformly tightly against said edge, said emblem comprising a crowned reflector glass with a thickened peripheral marginal structure having said shoulder means thereon.

3. In a composite article of manufacture, a supporting member having a hole defined by an underturned edge having a plurality of return bent spring fingers laterally offset from said edge and including retaining terminal portions directed at their tips generally axially outwardly and radially inwardly toward said hole and providing generally axially inwardly and radially inwardly facing resiliently yieldable cam surfaces, an insert of a diameter somewhat less than the radially outward extent of said fingers but of larger diameter than the radially inner circumference defined by the tips of the fingers, said insert having a shoulder facing generally axially outwardly and arranged to be cammed from the inside against said finger cam faces and past said fingers into engagement with said underturned edge and also having a shoulder directed obliquely generally axially inwardly and radially outwardly and resiliently engaged retainingly in thrust relation by the tips of said fingers which resiliently drive the first mentioned shoulder of the insert against said underturned edge to retain the insert in place on the supporting member in closing relation to said hole.

4. In a composite article of manufacture, a supporting member having a hole defined by an edge, an insert having a first shoulder engaging said edge and closing said hole and having an oblique shoulder facing generally radially outwardly and axially away from said edge, and a plurality of spring clips disposed in uniformly cooperative insert-retaining pattern about said edge and carried by said member, each of said clips being of generally U-shape with the bight thereof disposed remote from said oblique shoulder of the insert and with a retaining finger extending generally radially inwardly and axially toward said oblique shoulder and engaging the oblique shoulder resiliently in thrust relation to urge the first shoulder of the insert against said turned edge with a force which is a resultant of stressing the clips, said force tending to cause the clips to have enhanced gripping engagement with said oblique shoulder when counterforce is applied to said insert to drive it away from said underturned edge.

5. In a composite article of manufacture, a supporting member having a hole defined by a generally axially extending flange structure providing an edge formation joining the supporting member on a generally radially inwardly facing shoulder, said flange structure being turned back upon itself into said hole and having a plurality of return bent resilient retaining clip fingers with the body portions thereof extending generally radially outwardly and toward engagement with said shoulder, and terminal-retaining spring fingers directed generally radially inwardly and diagonally toward said hole, and an insert closing said hole and having a margin engaging said turned portion of said flange structure and including a shoulder facing generally toward the extremities of said clip fingers and engaged by said extremities and stressing said body portions against said juncture shoulder.

6. As an article of manufacture, a supporting member having a hole defined by a sheet material encompassing flange projecting axially relative to the supporting member and then turned into said hole and providing a shoulder facing generally axially into the hole, and a uniform series of retaining spring fingers projecting from the shoulder and having the body portions thereof projecting toward engagement with the juncture of said flange structure with said member, each of said fingers having a return bent generally axially extending flexible terminal finger portion projecting into said hole and having the tip thereof spaced axially from said shoulder for engaging the margin of a closure insert snapped past the clips against said shoulder.

GEORGE ALBERT LYON.

REFERENCES CITED

The following references are of record in the file of this patent:

UNITED STATES PATENTS

| Number | Name | Date |
|---|---|---|
| 1,354,512 | Pfeifer | Oct. 5, 1920 |
| 1,761,603 | Wainwright | June 3, 1930 |

FOREIGN PATENTS

| Number | Country | Date |
|---|---|---|
| 714,353 | France | Nov. 13, 1931 |
| 434,960 | Great Britain | Sept. 12, 1935 |